(12) United States Patent
Baker et al.

(10) Patent No.: US 9,360,233 B2
(45) Date of Patent: Jun. 7, 2016

(54) HEATED CONTAINER HAVING CHEMICAL HEATING MECHANISM

(71) Applicant: Tempra Technology, Inc., Bradenton, FL (US)

(72) Inventors: Gerald Baker, Wauwatosa, WI (US); Harley Jung, Ft. Atkinson, WI (US)

(73) Assignee: Tempra Technology, Inc., Bradenton, FL (US)

( * ) Notice: Subject to any disclaimer, the term of this patent is extended or adjusted under 35 U.S.C. 154(b) by 0 days.

(21) Appl. No.: 14/462,777

(22) Filed: Aug. 19, 2014

(65) Prior Publication Data

US 2014/0352683 A1 Dec. 4, 2014

Related U.S. Application Data

(62) Division of application No. 13/358,259, filed on Jan. 25, 2012, now abandoned.

(60) Provisional application No. 61/436,852, filed on Jan. 27, 2011.

(51) Int. Cl.
*A47J 39/00* (2006.01)
*A47G 23/04* (2006.01)
*F24J 1/00* (2006.01)
*A47J 36/28* (2006.01)

(52) U.S. Cl.
CPC ... *F24J 1/00* (2013.01); *A47J 36/28* (2013.01)

(58) Field of Classification Search
CPC ............. B65D 81/3484; B65D 81/38; B65D 81/3844; A47J 36/28; A47J 36/30; A47J 41/0044; A47J 36/2444; F24J 1/00; C09K 5/18

USPC ............... 220/506, 592.22, 592.16, DIG. 10; 126/262, 263.01
See application file for complete search history.

(56) References Cited

U.S. PATENT DOCUMENTS

| | | | |
|---|---|---|---|
| 2,482,779 A | 9/1949 | Katz | |
| 2,584,040 A | 1/1952 | Naranick | |
| 3,561,424 A * | 2/1971 | Failla | A47J 36/28 |
| | | | 126/262 |
| 3,802,056 A | 4/1974 | Jaeger | |
| 5,542,418 A | 8/1996 | James | |
| 6,481,214 B2 | 11/2002 | Peters | |
| 6,841,214 B1 * | 1/2005 | Keith | B29D 23/001 |
| | | | 428/35.8 |

(Continued)

FOREIGN PATENT DOCUMENTS

| | | |
|---|---|---|
| JP | 61193068 | 12/1986 |
| JP | 03218715 | 9/1991 |

(Continued)

OTHER PUBLICATIONS

International Search Report and Written Opinion for International Application No. PCT/US2011/043886, mail date Feb. 28, 2012, 13 pages.

*Primary Examiner* — Shawn M Braden
(74) *Attorney, Agent, or Firm* — Sheehan Phinney Bass & Green PA

(57) ABSTRACT

A self-heating food container configured to hold food and to heat food within the container is provided. The container includes a body wall. A space is defined within the body wall. A chemical heater is located within the space, which upon activation, is configured to generate heat, thereby increasing the temperature of the contents cavity.

16 Claims, 9 Drawing Sheets

(56) References Cited

U.S. PATENT DOCUMENTS

| | | |
|---|---|---|
| 7,350,361 B2 | 4/2008 | Maxwell et al. |
| 7,350,362 B2 | 4/2008 | Danwoody |
| D672,663 S | 12/2012 | Baker et al. |
| 2007/0261692 A1* | 11/2007 | Bolmer ............ B65D 81/3484 126/263.01 |
| 2008/0302799 A1 | 12/2008 | Moore et al. |
| 2009/0078711 A1 | 3/2009 | Farone |
| 2010/0025279 A1 | 2/2010 | Baker et al. |
| 2011/0011868 A1 | 1/2011 | Manne et al. |
| 2011/0226771 A1 | 9/2011 | Manne et al. |
| 2011/0240656 A1 | 10/2011 | Widitora et al. |
| 2012/0031913 A1 | 2/2012 | Moore et al. |

FOREIGN PATENT DOCUMENTS

| | | |
|---|---|---|
| JP | 2002544072 | 12/2002 |
| WO | 03097481 | 11/2003 |
| WO | 2012012246 | 1/2012 |

\* cited by examiner

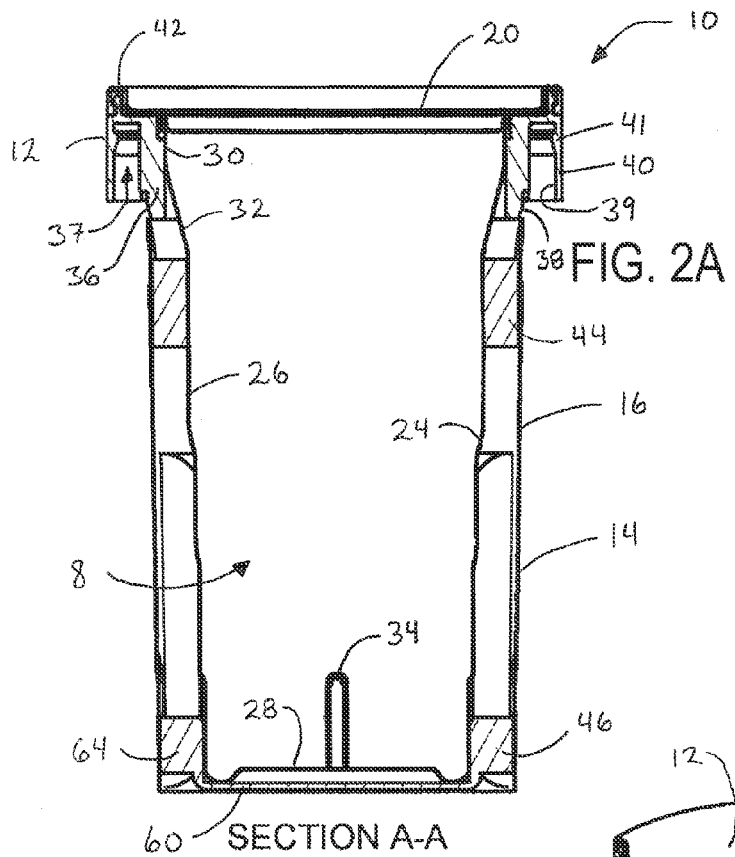
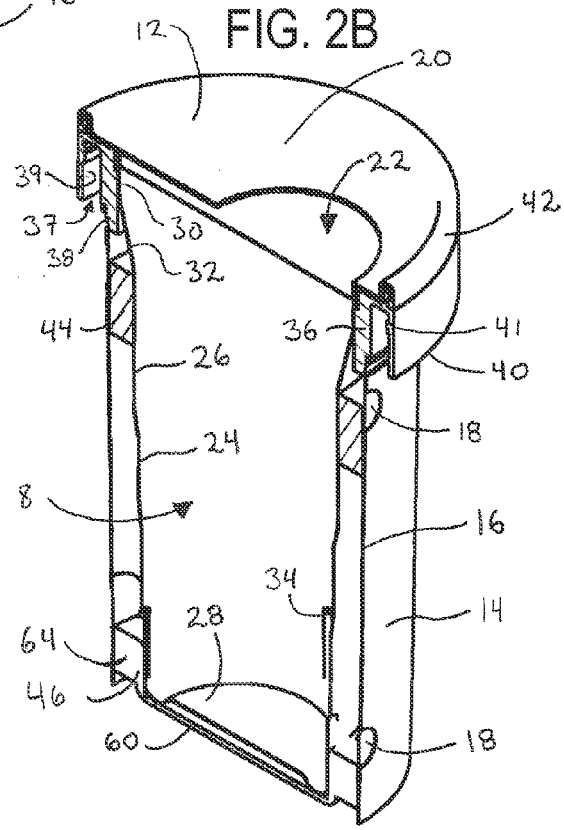

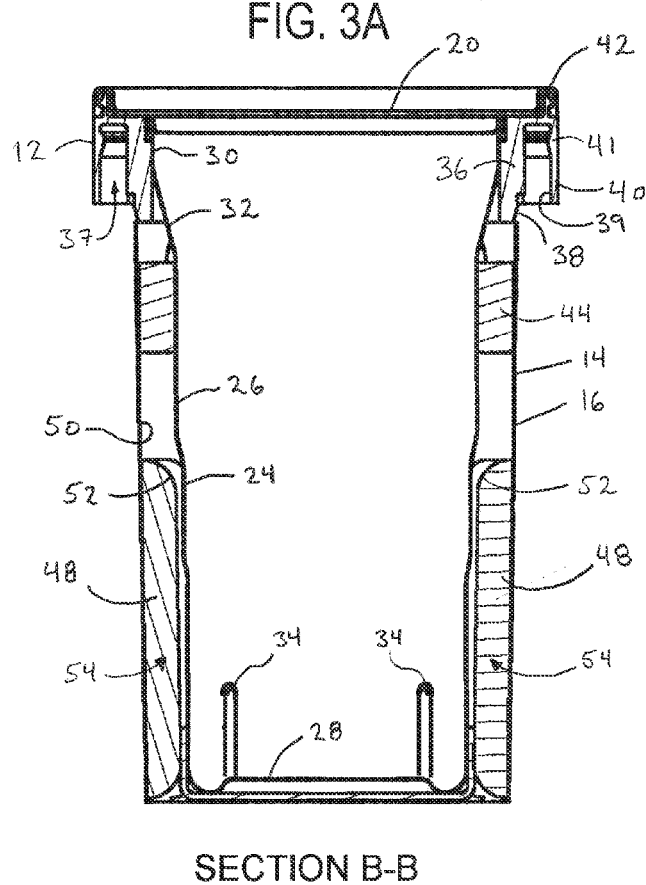
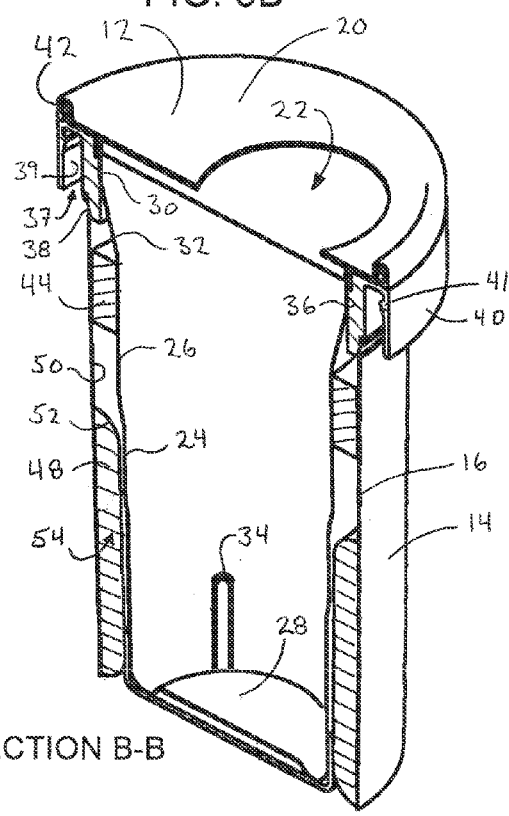

SECTION C-C

SECTION C-C

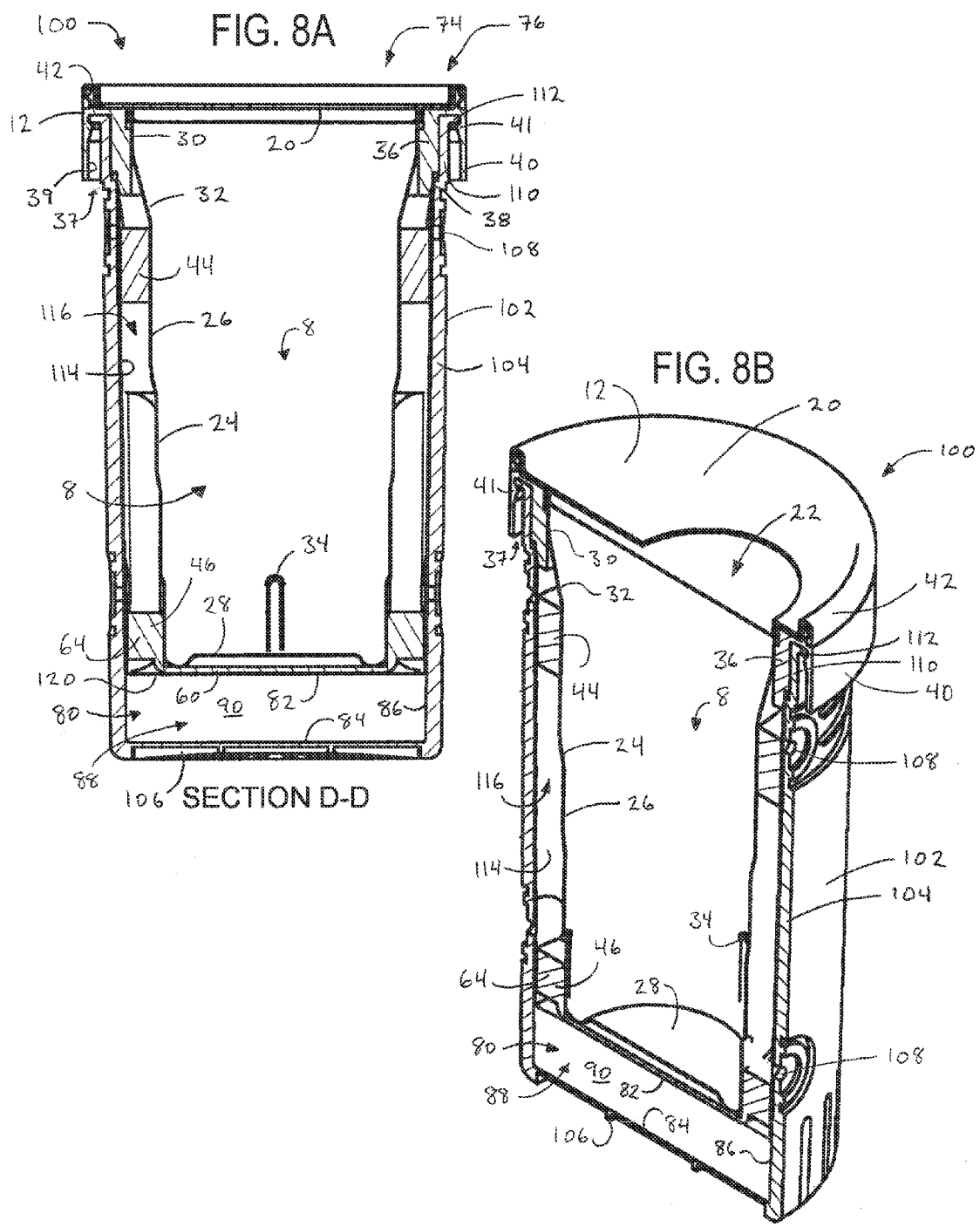

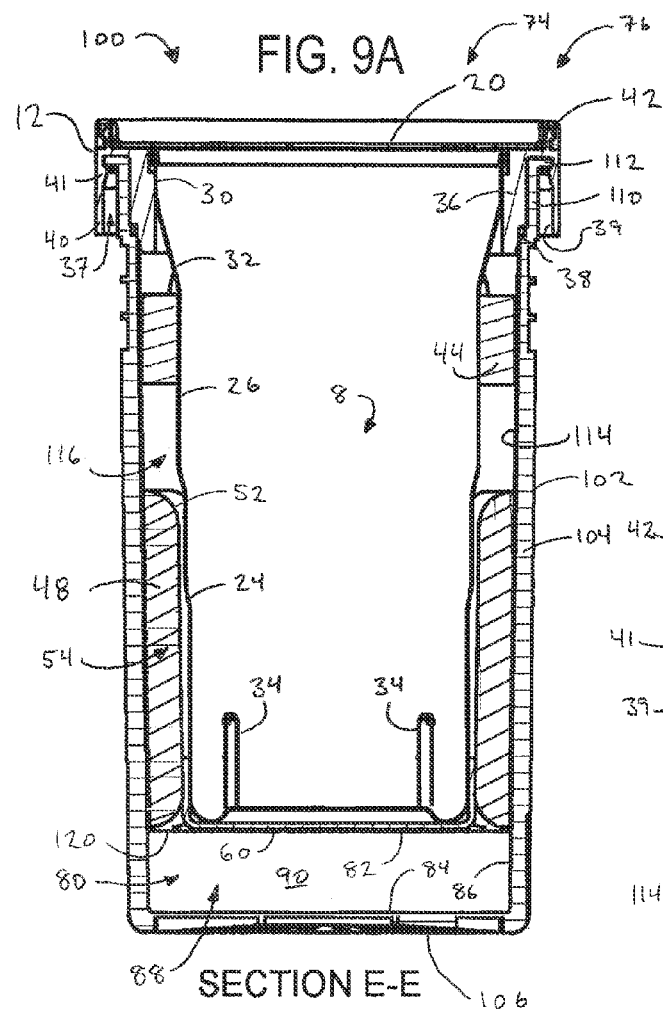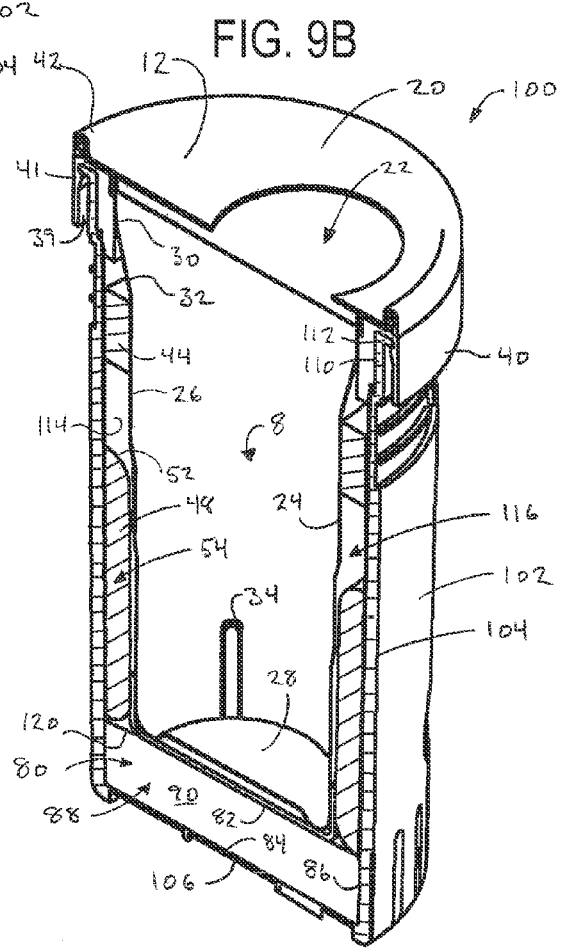

HEATED CONTAINER HAVING CHEMICAL HEATING MECHANISM

CROSS-REFERENCE TO RELATED PATENT APPLICATIONS

This application is a divisional application of, and claims priority to U.S. application Ser. No. 13/358,259 titled "HEATED CONTAINER HAVING CHEMICAL HEATING MECHANISM," filed Jan. 25, 2012, which claims the benefit of U.S. Provisional Patent Application No. 61/436,852 titled "HEATED CONTAINER WITH IMPROVED CHEMICAL MANIPULATION," filed Jan. 27, 2011, both of which applications are incorporated herein by reference in their entireties.

BACKGROUND OF THE INVENTION

The present invention relates generally to the field of containers. The present invention relates specifically to a container, such as a beverage or food container, having a chemical warming mechanism.

SUMMARY OF THE INVENTION

One embodiment of the invention relates to a self-heating food container including an outer container and an inner container. The outer container includes a sidewall, a bottom wall and an inner surface defining a cavity. The inner container is received within the cavity of the outer container. The inner container is includes a sidewall, a bottom wall, an inner surface and an outer surface. The inner surface of the inner container defines an interior cavity configured to hold food. A space is defined between the inner surface of the outer container and the outer surface of the inner container. A chemical heat source is positioned within the space and is in thermal communication with the inner container. An activation element is in communication with the chemical heat source. The activation element is configured to be manipulated by a user to trigger heat generation by the chemical heat source to heat food held within the interior cavity of the inner container.

Another embodiment of the invention relates to a self-heating food container configured to hold food and to heat food within the container. The container includes a body wall having an inner surface, an outer surface and an upper end. A contents cavity is defined by the inner surface of the body wall and is configured to hold the food contents of the container. There is an opening defined at the upper end of the sidewall through which the food contents of the container may be removed. A space is defined within the body wall and is located between the inner surface and the outer surface of the body wall. A chemical heater is located within the space, which upon activation, is configured to generate heat, thereby increasing the temperature of the contents cavity. A deactivator is located within the space and is configured to decrease the amount of heat generated by the chemical heater when a threshold temperature is reached.

Another embodiment of the invention relates to a handheld, self-heating food container configured to hold and to heat a serving of food within the container. The container includes a body wall having an inner surface, an outer surface and an upper end. A contents cavity is defined by the inner surface of the body wall and is configured to hold a serving a food. An opening is defined at the upper end of the sidewall through which the serving of food may be removed. A space is defined within the body wall and is located between the inner surface and the outer surface of the body wall. A chemical heater is located within the space and includes a frangible shell and a heating chemical located within the frangible shell. An activator including a cutting surface is configured to pierce the frangible shell triggering heat generation by the chemical heater.

In various embodiments of the invention, it is desirable to provide a container capable of generating sufficient heat to warm a beverage or food contained therein, for example, by an exothermic chemical reaction. Specifically, in various embodiments of the invention, it is desirable to provide an apparatus and methods for handling, assembling, storing, and/or intermixing such reaction chemicals or components in a container to generate heat. The summarized features of the invention, as well as additional inventive features, will be apparent from the description of the embodiments of the invention provided herein. Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which:

FIG. 2A is a cross-sectional view of the heating assembly of FIG. 1A along section line A-A;

FIG. 2B is a perspective cross-sectional view of the heating assembly of FIG. 1A along section line A-A;

FIG. 3A is a cross-sectional view of the heating assembly of FIG. 1B along section line B-B;

FIG. 3B is a perspective cross-sectional view of the heating assembly of FIG. 1B along section line B-B;

FIG. 8A is a cross-sectional view of the heated container of FIG. 7A along section line D-D;

FIG. 8B is a perspective cross-sectional view of the heated container of FIG. 7A along section line D-D;

FIG. 9A is a cross-sectional view of the heated container of FIG. 7B along section line E-E; and FIG. 9B is a perspective cross-sectional view of the heated container of FIG. 7B along section line E-E.

DESCRIPTION OF THE INVENTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1A:
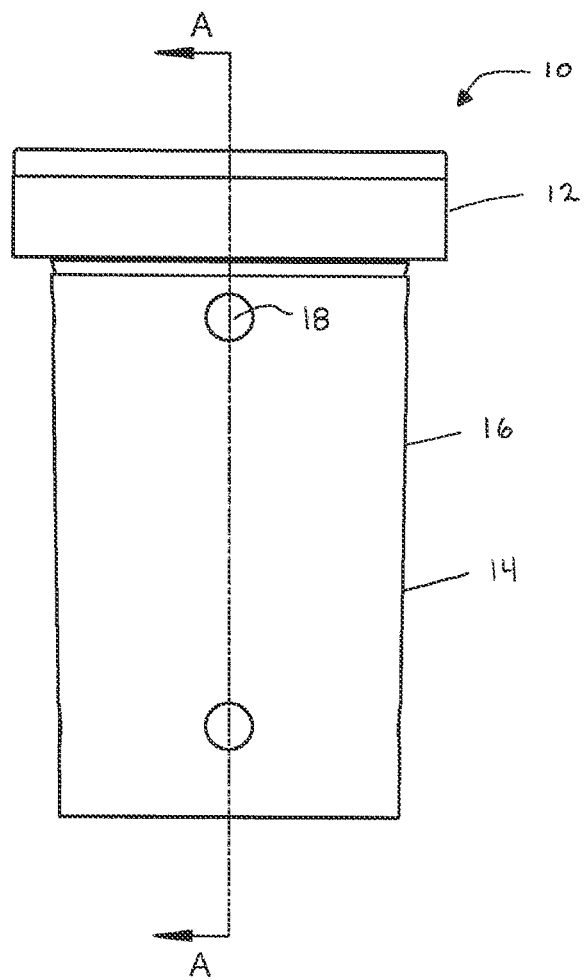
FIG. 1A is a side view of a heating assembly according to an exemplary embodiment.

FIG. 1A shows an embodiment of a heating assembly 10 for use with a heated container. Heating assembly 10 includes a cap 12 and a liquid packet carrier 14. Liquid packet carrier 14 includes a generally cylindrical carrier side wall 16 and is provided with a plurality of openings or vents 18. As shown, liquid carrier 14 is provided with eight vents 18.

Figure 1B:
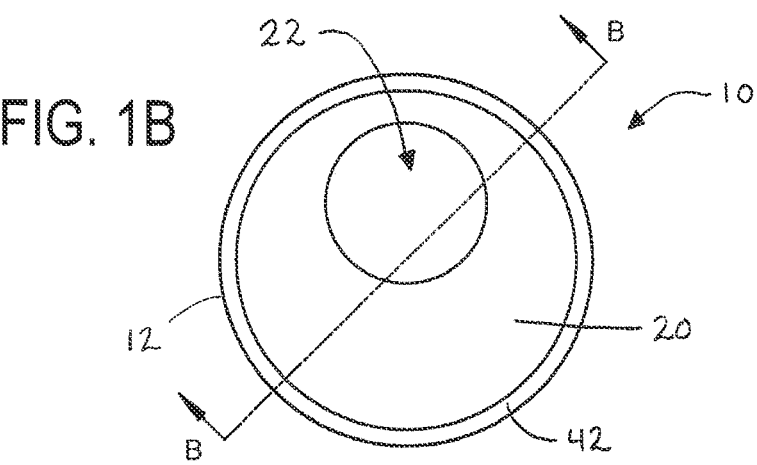
FIG. 1B is a top view of a heating assembly according to an exemplary embodiment.

FIG. 1B shows a top view of cap 12. Cap 12 includes a top wall 20 having an opening 22. Opening 22 may be any size or shape suitable for removal or consumption of a beverage or food contained within heating assembly 10. Opening 22 may be resealably or non-resealably closed with any type of closure known in the art (screw-on closure, stay tab, foil tape tab, etc.).

Referring to FIGS. 2A and 2B, cross-sectional views of the heating assembly 10 are shown. Heating assembly 10 further includes an inner container, shown as inner cup 24, disposed within liquid packet carrier 14. Inner cup 24 includes a side wall 26, the side wall 26 shown as a generally cylindrical cup wall 26, a closed bottom wall or end 28, and an open top end 30, together defining a beverage or food volume 8. Open top end 30 provides an opening at the upper end of the sidewall through which the food contents of the container may be removed. In the embodiment shown in FIGS. 2A and 2B, the inner surface of side wall 26 defines an interior cavity of the container that is configured to hold the food (e.g., edible material, solid food, beverage, etc.). As shown, cup wall 26 includes one or more frustoconical portions 32 configured to reduce the diameter of inner cup 24 between open top end 30 and closed bottom end 28. In another embodiment, side wall 26 of inner cup 24 may be smoothly tapered between open top end 30 and closed bottom end 28, or any other combination of cylindrical cup wall portions, frustoconical wall portions, and tapered wall portions. Inner cup 24 also includes one or more recesses or notches 34 formed in the sidewall and recessed inward relative to the outer surface of inner cup 24.

Inner cup 24 is formed of a thermally conductive material such that heat from a heat source on the outside of inner cup 24 may be conducted into the food cavity of cup 24 to raise the temperature of the contents of the cavity. In a preferred embodiment, inner cup 24 is formed of a metal material, and in particular, may be an aluminum alloy formed through a deep-drawing process. In other embodiments, inner cup 24 may be formed of another metal, or may be formed of a plastic or composite material. Additionally, the self-heating container includes an activation element or activator configured to be manipulated by a user to trigger heat generation by a heater within the container. In the embodiment shown in FIGS. 2A and 2B, the activator includes a cutter 46. Cutter 46 is located outside of inner cup 24 and is fixedly coupled to closed bottom end 28 of inner cup 24, such that rotation of inner cup 24 also causes rotation of cutter 46.

In the embodiment shown, the container includes a temperature sensitive deactivation element or deactivator, shown as wax ring 44. Wax ring 44 is shown disposed on the outer circumference or outer surface of side wall 26 of inner cup 24. Wax ring 44 is configured to decrease the amount of heat generated by the chemical heater of the container. In a preferred embodiment, wax ring 44 is embedded with or impregnated with a quenching material, such as a chemical or substance that moderates or quenches an exothermic reaction, as disclosed in U.S. patent application Ser. Nos. 11/568,683, 11/569,654, 12/446,731, and 12/513,905, each of which is hereby incorporated by reference in their entirety. In various embodiments, upon release from the deactivation element, the quenching material mixes with the heat generating chemical to decrease heat generation.

Wax ring 44 may or may not provide a seal between side wall 26 of inner cup 24 and carrier side wall 16 of liquid packet carrier 14. As shown, wax ring 44 forms a continuous ring surrounding side wall 26 of inner cup 24. In other embodiments, wax ring 44 may be discontinuous, or may be affixed to the side wall 16 of liquid packet carrier 14. In still other embodiments, a wax material may be used to releasably secure a second, separate material to the side wall 26 of inner cup 24 or to the side wall 16 of liquid packet carrier 14. Alternatively, the wax material of wax ring 44 may be selected to moderate or quench an exothermic reaction by absorbing heat through a phase change from a solid wax material to a liquid wax material, without incorporation of an additional chemical or substance into wax ring 44 to moderate or quench such a reaction.

Cap 12 further includes a upper wall 36, the upper wall 36 having a lower shoulder 38, an outer flange 40, and a circumferential lip 42. Upper wall 36 and outer flange 40 define an annular opening or gap 37. Shoulder 38 of cap 12 rotatingly contacts liquid packet carrier 10, as described in more detail below. As shown, outer flange 40 includes circumferential bead 41 disposed on the inside surface 39 of outer flange 40. In a preferred embodiment, cap 12 is injection molded from a plastic material.

Upper wall 36 of cap 12 is fixedly connected to inner cup 24 proximate to open top end 30. Upper wall 36 may be affixed to inner cup 24 by a variety of methods (e.g. friction fit, snap engagement, adhesive, welding) such that the seam between upper wall 36 and inner cup 24 is generally impermeable to liquids and vapors, and such that rotation of cap 12 additional rotates inner cup 24. Lower shoulder 38 rotatingly contacts liquid packet carrier 14 but does not cause rotation of liquid packet carrier 14 when cap 12 and inner cup 24 are rotated.

Figure 4A:
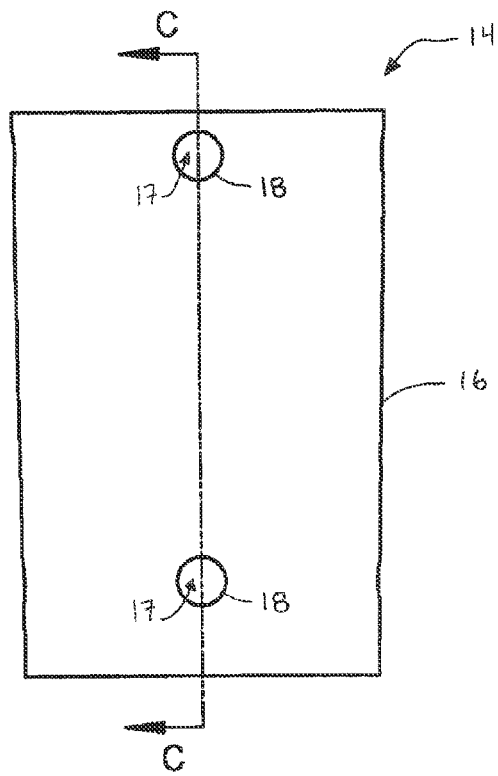
FIG. 4A is a side view of a liquid packet carrier according to an exemplary embodiment.
Figure 4B:
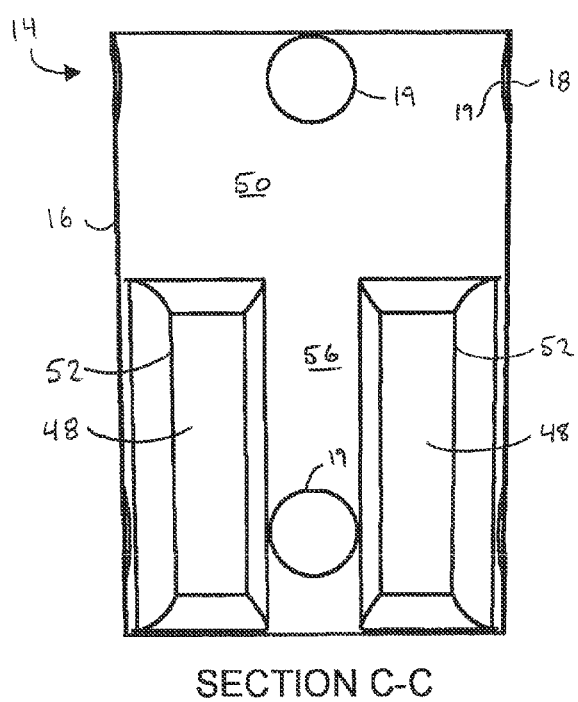
FIG. 4B is a cross-sectional view of the liquid packet carrier of FIG. 4A along section line C-C.
Figure 4C:
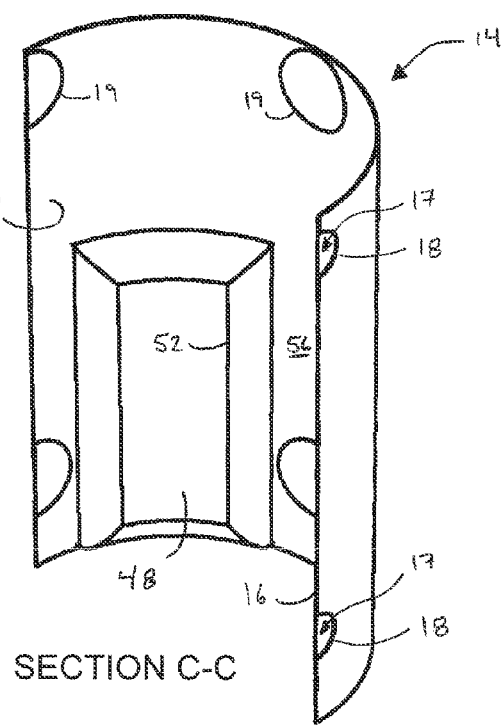
FIG. 4C is a perspective cross-sectional view of the liquid packet carrier of FIG. 4A along section line C-C.

Referring to FIGS. 3A and 3B, cross sectional views along section B-B, 45 degrees offset from section A-A, are shown. One or more chemical heat sources or heaters, shown as liquid packets 48, are disposed on the inner surface 50 of liquid packet carrier 14. Liquid packets 48 include an exterior shell 52 surrounding a liquid 54. In various embodiments, exterior shell 52 is a frangible and hermetic shell containing one or more heating chemical, shown as liquid 54. Exterior shell 52 may be formed from a polymer sheet or plastic material. As shown in FIGS. 4A-4C, one or more liquid packets 48 may be disposed on the inner surface of liquid packet carrier 14. Where multiple liquid packets 48 are disposed on the inner surface 50 of liquid packet carrier 14, an open area 56 of inner surface 50 is provided to spatially separate liquid packets 48. As shown, vents 18 may be disposed in carrier side wall 16 of liquid packet carrier 14, including within open area 56.

Figure 5C:
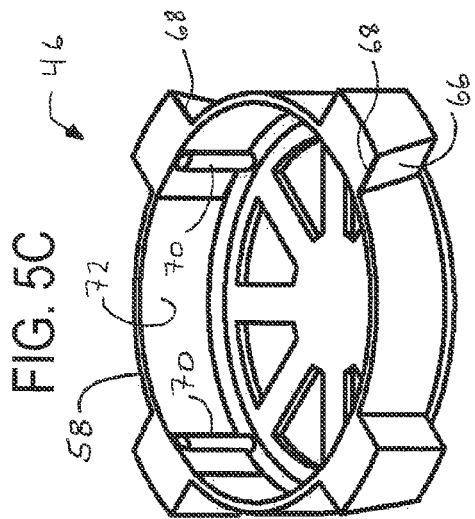
FIG. 5C is a perspective view of a cutter according to an exemplary embodiment.
Figure 5A:
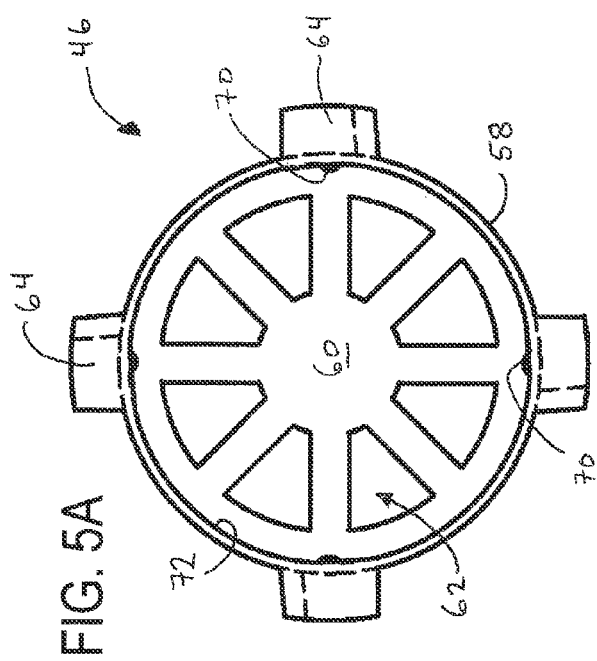
FIG. 5A is a top view of a cutter according to an exemplary embodiment.
Figure 5B:
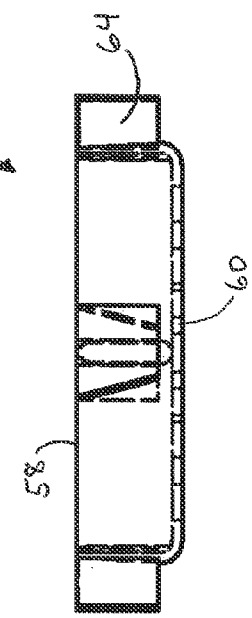
FIG. 5B is a side view of a cutter according to an exemplary embodiment.

Referring to FIGS. 5A-5C, a cutter 46 is shown. Cutter 46 includes a cutter wall 58, a cutter bottom 60, and one or more cutting structures, shown as cutting heads 64. Cutter bottom 60 may be imperforate, or may include a plurality of openings 62. Openings 62 generally reduce the amount of material used to manufacture cutter 46, thereby reducing weight and material cost. Cutting heads 64 include a sloped surface 66 and a leading edge 68. In various embodiments, leading edge 68 may be serrated or provided with a point capable of piercing the exterior shell of liquid packet 48. A plurality of detents 70 are disposed on the interior surface 72 of cutter wall 58. Detents 70 are sized and spaced to fit within recesses 34 when cutter 46 is affixed to closed bottom end 28 of inner cup 24. In other embodiments, cutter 46 may be adhered (glued, friction fit, welded, etc.) to the bottom of inner cup 24, thereby reducing or eliminating the need for mated recesses 34 and detents 70. Alternatively, inner cup 24 may be provided with integrally formed cutting heads 64 disposed on side wall 26 of inner cup 24 and/or on closed bottom end 28 of inner cup 24.

Figure 6:
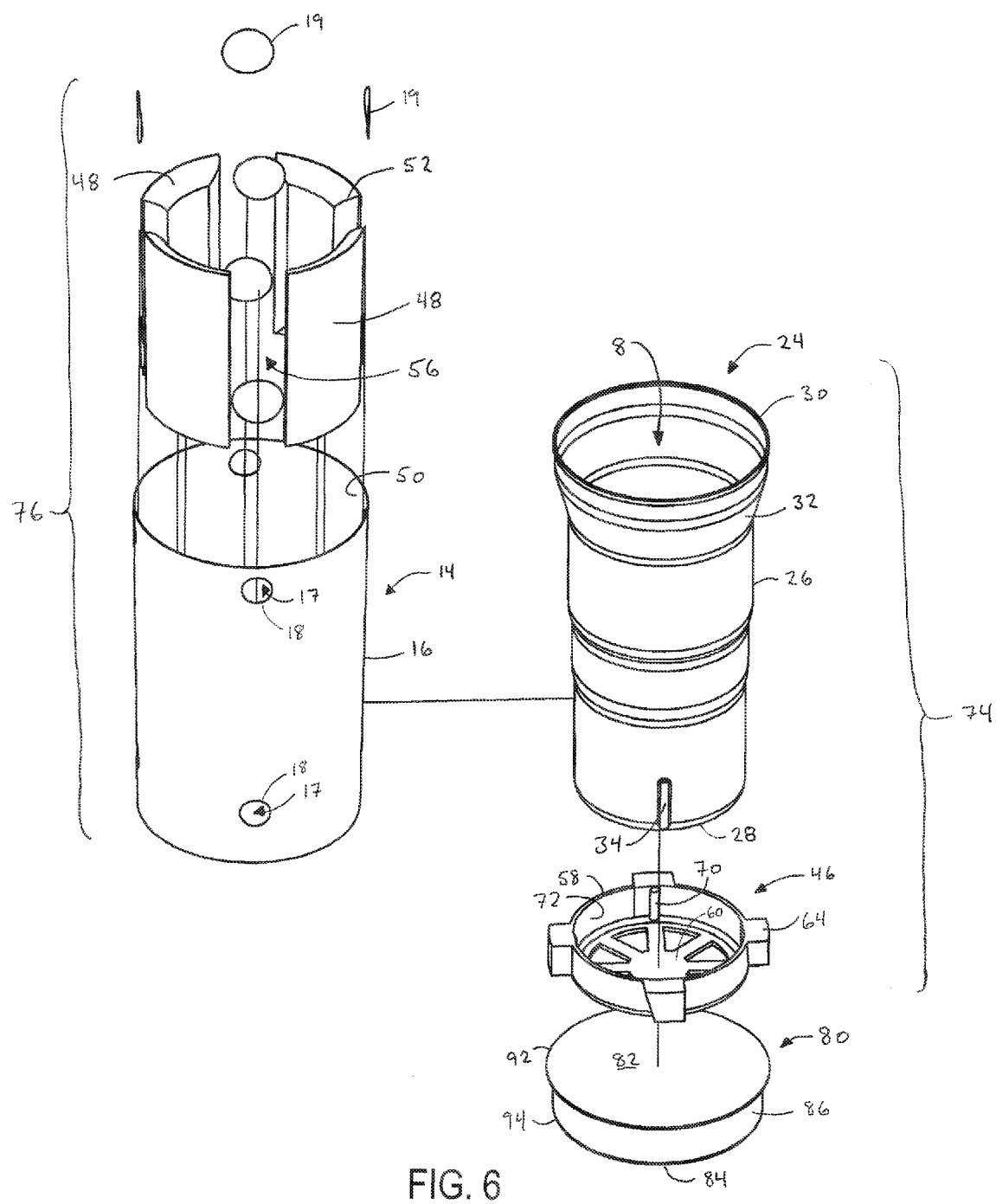
FIG. 6 is an exploded perspective view of the heating assembly of FIGS. 1-5.

Referring to FIG. 6, an exploded perspective view of heating assembly 10 is shown. Cutter 46 is mated to the bottom of inner cup 24 such that detents 70 are slidably received within recesses 34. Generally, the diameter of cutter wall 58 is sized to snugly surround the bottom of inner cup 24, proximate to closed bottom end 28. Together, inner cup 24 and cutter 46 form cup assembly 74.

As shown, liquid packets 48 are disposed on the inner surface 50 of liquid packet carrier 14 such that liquid packets 48 are separated by open areas 56. Vents 18 in carrier side wall are formed from an opening 17 in carrier wall 16, and a vent cover 19 affixed over opening 17, thereby providing a gas permeable vent 18 that is resistant to penetration by liquids. In a preferred embodiment, vent cover 19 may be a hydrophobic fabric material. Together, liquid packet carrier 14, liquid packets 48, and vent covers 19 form packet assembly 76.

A powder assembly 80 is disposed below and adjacent to cup assembly 74 and packet assembly 76, as further disclosed below. Powder container 80 includes a top surface 82 and a bottom surface 84, and optionally includes a side surface 86, together defining an internal cavity 88 (best shown in FIGS. 8 and 9) for containing a solid material such as a chemically reactive material 90. In another embodiment, edge 92 of top surface 82 may be joined directly to edge 94 of bottom surface 84, forming a pillow-shaped container 80. In a preferred embodiment, one or more surfaces of powder container 80 is formed of a liquid-permeable material, such as a screen, mesh, porous paper, etc.), a liquid soluble material, or a liquid reactive material, such that liquid 54 will penetrate into or through powder container 80 and contact the contents of powder container 80.

As shown in FIG. 6, cup assembly 74 is coaxially disposed within packet assembly 76. When assembled, cutting heads 64 are positioned in between liquid packets 48, adjacent to open areas 56 of inner surface 50 of carrier side wall 16, such that rotation of cup assembly 74 within packet assembly 76 causes cutting heads 64 to pierce, compress, rupture, or cut adjacent liquid packets 48.

Figure 7A:
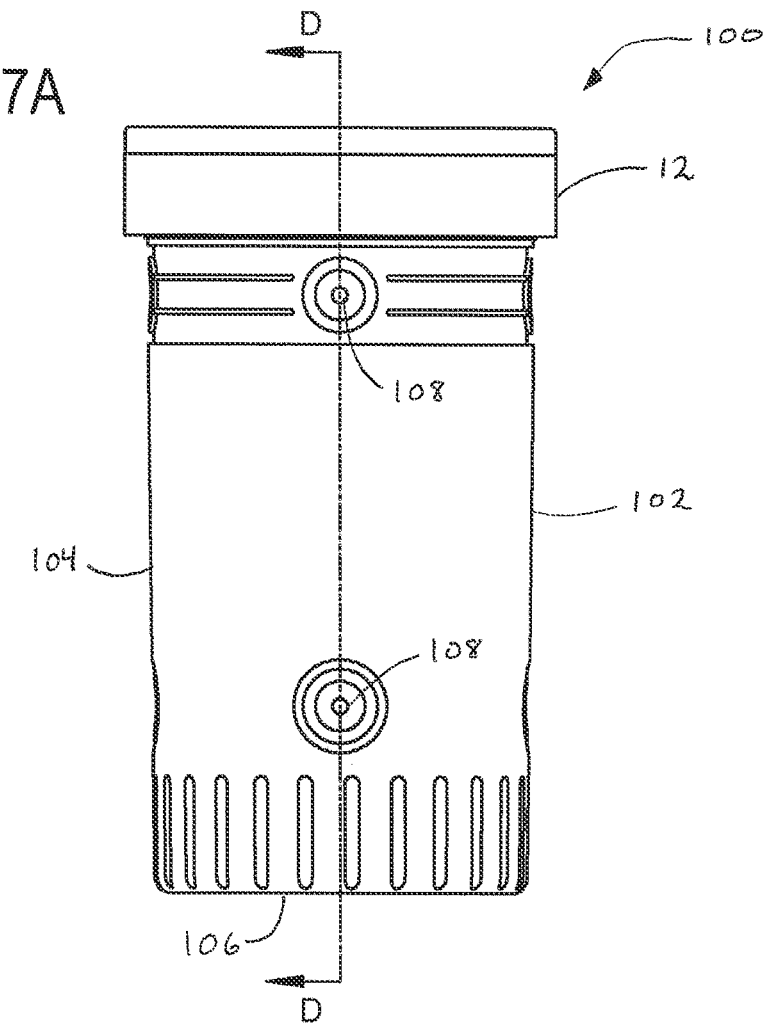
FIG. 7A is a side view of an assembled heated container according to an exemplary embodiment.
Figure 7B:
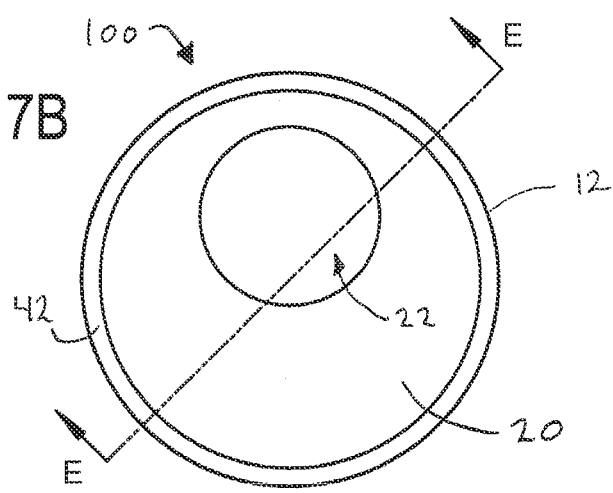
FIG. 7B is a top view of an assembled heated container according to an exemplary embodiment.

Referring to FIGS. 7A and 7B, a heated container 100 is shown. Heated container 100 includes an outer cup 102 and a cap 12, the outer wall 102 having a generally cylindrical outer wall 104, an outer closed end 106, and external gas vents 108. External gas vents include a perforation in outer wall 104, thereby allowing the passage of gas from the inside of outer cup 102 to the outside of outer cup 102. Outer wall 104 may be further covered with, for example, a printed sleeve or label (paper, plastic, cardboard, etc., not shown) to display product marketing information and to reduce thermal conductivity to the hand of a consumer.

Referring to FIGS. 8A-8B, cross-sectional views of the heated container 100 are shown. Generally, heated container 100 includes a body wall, and in the embodiment shown, the body wall of the container is formed from an outer container, shown outer cup 102, and from inner cup 24. As noted above, outer cup 102 has a sidewall, shown as wall 104, a bottom wall, shown as closed end 106 and an inner surface 114 that defines a cavity. Inner cup 24 is received within the cavity of outer cup 102. Generally, a space 116 is defined between the outer surface of inner cup 24 and inner surface 114 of outer cup 102. In other embodiments, the body wall of container 100 may be one integral structure or inner and outer containers bonded together.

In the embodiment shown in FIG. 8A, packet assembly 76 is concentrically disposed within outer cup 102, and packet assembly 76 is affixed to the inner surface 114 of outer wall 104, thereby rotationally locking packet assembly 76 within outer cup 102. In this embodiment, liquid packets 48 are positioned within space 116 and are in thermal communication with inner cup 24. Packet assembly may be mechanically coupled to outer cup 102 via a coupling such as a press-fit, friction-fit, etc. In other embodiments, packet assembly 76 may be adhered (glued, welded, etc.) to the inner surface 114 of outer cup 102. Alternatively, liquid packets 48 may be disposed directly onto the inner surface 114 of outer wall 104. In yet another embodiment, liquid packet carrier 14 and liquid packets 48 may be integrally formed from two layers of a film or foil, the film or foil layers having discreet liquid volumes therebetween, and the film or foil coupled to the inner surface 114 of outer wall 104.

Heated container 100 further includes an outer top end 110 formed at the upper end of the sidewall of outer cup 102. Outer top end 110 includes a bead engagement ring 112. Cup assembly 74, including joined inner cup 24 and cap 12, is concentrically disposed within packet assembly 76 and outer cup 102, such that outer top end 110 of outer cup 102 is slidably received by annular gap 37 of cap 12. When cap 12 is pressed on to outer cup 102, bead engagement ring 112 is snappingly received by circumferential bead 41, thereby securing assembly 74 within the combined packet assembly 76 and outer cup 102. Annular gap 37 may be further provided with a friction mechanism (detent, breakaway tab, ratchet, etc., not shown) configured to engage outer top end 110 to restrict rotation movement of cap 12 relative to outer cup 102 prior to user activation of heated container 100.

In the embodiment shown, liquid packet carrier 14 is located inside the cavity of outer cup 102 within space 116. In this embodiment, cylindrical cup wall 26 of inner cup 24 has an outer surface that opposes both the inner surface of outer cup 102 and the inner surface of carrier side wall 16 of liquid packet carrier 14. Packet assembly 76 is oriented within outer cup 102 such that vents 18 are aligned with external gas vents 108, thereby permitting gasses generated in annular space 116 to escape to the exterior of outer cup 102. Further, the cutting surface or structure of cutter 46 is located within space 116 in a position configured to pierce exterior shell 52 upon manipulation by the user.

Powder container 80 is disposed at the bottom of outer cup 102, adjacent to outer closed end 106. In another embodiment, bottom outer wall 106 and a portion of outer side wall 104 adjacent thereto receives a quantity of chemically reactive material 90, and a foil seal 120 is placed between chemically reactive material 90 and cutter 46. In such an embodiment, rotation of cup assembly 74 relative to outer cup 102 compresses, ruptures, and/or cuts both liquid packets 48 and rips foil seal 120, thereby permitting liquid 54 and chemically reactive material 90 to intermix. In this embodiment, mixture of material 90 and liquid 54 generates heat which in turn heats the food held within the contents cavity on the container. In another embodiment, container 100 may not include material 90, and in this embodiment, liquid 54 undergoes an exothermic reaction upon exposure to air.

As noted above, heated container 100 includes an activation element or activator that is manipulated by the user to trigger heat generation by the chemical heat source. In the embodiment shown, to operate the heated container 100, a user applies a physical force or moment force to cap 12 relative to outer cup 102, thereby causing cup assembly 74 (i.e., cap 12, inner cup 24, cutter 46) to rotate around the longitudinal axis of heated container 100. In the assembled configuration shown, when viewed from the top of heated container 100, a clockwise rotation of cap 12 relative to outer cup 102 will cause rotation of cutter 46 within space 116 and cause sloped surface 66 and leading edge 68 of cutter 46 to cut into liquid packets 48. Rotation of cup assembly 74 relative to outer cup 102 and packet assembly 76 causes cutting heads 64 to pierce, compress, rupture, and/or cut adjacent liquid packets 48, thereby intermixing liquid contents 54 of liquid packets 48 and the chemically reactive material 90 of powder container 80. In another embodiment, the activator may be a spring-loaded cutting structure, and the user applies a physical force to release the spring, which in turn drives the cutting structure to pierce the adjacent liquid packet 48.

The mixture of liquid 54 and chemically reactive material 90 causes an exothermic reaction, thereby generating heat and warming the contents 8 of inner cup 24. If the exothermic reaction produces excess heat and/or pressure, steam or other gaseous reaction products are vented from annular space 116 to the outside of outer cup 102 through aligned vents 18, 108. Vent cover 19 permits pressurized steam and/or gaseous reaction products to escape heated container 100, while restricting the passage of liquids (liquid packet contents 54 or reaction products) through vents 18, 108.

In some embodiments, the exothermic reaction of liquid 54 and chemically reactive material 90 may produce an amount of heat in excess of that required to warm the contents of beverage volume 8. To help heat the contents of the container 100 to the proper temperature, container 100 includes a deactivator, shown as wax ring 44, that is configured to decrease heat production when a threshold temperature is reached.

As shown in FIGS. 8A and 8B, wax ring 44 divides space 116 into an upper section and lower section with liquid packets 48 positioned in the lower section. As the inner cup 24 and annular space 116 are warmed, heat is transferred to wax ring 44, thereby softening and melting wax ring 44 at a variable temperature determined by the properties of the wax material and an additive to the wax material, if present. When wax ring 44 is partially or completely melted, wax ring 44 disengages from or drops off and away from side wall 26 of inner cup 24 and into the exothermic reaction mixture of liquid 54 and chemically reactive material 90 located adjacent to closed bottom end 106, thereby allowing the quenching material of wax ring 44 to moderate or quench the exothermic reaction. In some embodiments, wax ring 44 may be impregnated with additional chemical reactants having a moderating or quenching effect on the exothermic reaction mixture. In another embodiment, the quenching material may be located in the upper section above wax ring 44, and the quenching material is released to mix with the heating chemicals upon melting of wax ring 44.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

Containers discussed herein may include containers of any style, shape, size, etc. For example, the containers discussed herein may be shaped such that cross-sections taken perpendicular to the longitudinal axis of the container are generally circular. However, in other embodiments the sidewall of the containers discussed herein may be shaped in a variety of ways (e.g., having other non-polygonal cross-sections, as a rectangular prism, a polygonal prism, any number of irregular shapes, etc.) as may be desirable for different applications or aesthetic reasons. In various embodiments, the sidewall of the container may include one or more axially extending sidewall sections that are curved radially inwardly or outwardly such that the diameter of the container is different at different places along the axial length of the container, and such curved sections may be smooth continuous curved sections. In one embodiment, the container may be hourglass shaped. The container may be of various sizes (e.g., 3 oz., 8 oz., 12 oz., 15 oz., 28 oz., etc.) as desired for a particular application.

The containers discussed herein may be used to hold various edible food or beverage contents (e.g., food products, drink, pet food, milk-based products, coffee beverages, etc.). It should be understood that the phrase "food" used to describe various embodiments of this disclosure may refer to dry food, moist food, powder, liquid, beverage or any other drinkable or edible material, regardless of nutritional value. In other embodiments, the containers discussed herein may be used to hold non-perishable materials or non-food materials.

The invention claimed is:

1. A self-heating assembly for food, the assembly comprising:
    an outer container comprising a sidewall, a bottom wall and an inner surface defining a cavity;
    an inner container received within the cavity of the outer container, the inner container comprising a sidewall, a bottom wall, an inner surface and an outer surface, the inner surface of the inner container defining an interior cavity configured to hold food;
    a reaction space defined between the inner surface of the outer container and the outer surface of the inner container;

a chemical heat source positioned within the reaction space and in thermal communication with the inner container; and an activation element configured to be manipulated by a user to trigger heat generation by the chemical heat source to heat food held within the interior cavity of the inner container, wherein the chemical heat source comprises one or more heating chemicals in a frangible and hermetically sealed shell and a solid chemically reactive material in the reaction space, wherein the activation element comprises a cutting structure located within the reaction space, the cutting structure configured to pierce the hermetically sealed shell upon manipulation of the activation element by the user, thereby allowing the one or more heating chemicals to mix with the solid chemically reactive material; and a temperature sensitive deactivation element located within the reaction space between the outer container and the inner container and configured to decrease an amount of heat generated by the chemical heater when a threshold temperature is reached within the food product, wherein the temperature sensitive deactivation element releases a quenching material at a predetermined temperature within the food product that mixes with the chemical heat source to decrease the heat generated by the chemical heat source, and wherein the temperature sensitive deactivation element comprises a ring adhered to the outer surface of the inner container.

2. The self-heating assembly of claim 1, wherein the activation element is configured such that when a user applies a physical force to the activation element, the applied force causes the cutting structure to pierce the hermetically sealed shell.

3. The self-heating assembly of claim 1, wherein the inner container is rotatable relative to the outer container, wherein rotation of the inner container causes the activation element to trigger heat generation.

4. The self-heating assembly of claim 1, wherein the ring is formed of a material having a melt temperature selected such that, when a portion of the ring in contact with the outer surface of the inner container reaches the melt temperature, the portion of the ring in contact with the outer surface of the inner container melts, disengaging from the outer surface of the inner container, allowing the quenching material to drop into contact with the chemical heat source by force of gravity.

5. The self-heating assembly of claim 4, wherein the ring is formed from a wax material and the quenching material is embedded within the wax material.

6. A self-heating assembly configured to hold food contents and to heat the food contents within the assembly, the assembly comprising:

an inner cup having an inner surface, an outer surface and an upper end;

a food product cavity defined by the inner surface of the inner container, the food product cavity configured to hold the food contents of the container;

a reaction space between an inner surface of an outer cup and the outer surface of the inner cup;

a chemical heater located within the reaction space, which upon activation, is configured to generate heat increasing the temperature of the inner cup, wherein the chemical heater comprises a first chemical in a hermetically sealed exterior shell and a second chemical in the reaction space outside the hermetically sealed exterior shell;

an activation element comprising a cutting structure located within the reaction space, the cutting structure configured to activate heat generation upon manipulation of the activation element by a user, and a deactivator located within the reaction space and configured to decrease the amount of heat generated by the chemical heater when a threshold temperature is reached within the food product, wherein the deactivator releases a quenching material when the threshold temperature is reached within the food product, the quenching material mixing with the chemical heat source to decrease the heat generated by the chemical heat source, wherein the deactivator is located in the reaction space above the chemical heater such that the quenching material falls into contact with the chemical heater upon release, and wherein the deactivator comprises a ring attached to the outer surface of the inner cup, the ring formed of a material having a melt temperature selected such that, when the outer surface of the inner cup reaches; the melt temperature of the ring, a surface of the ring in contact with the outer surface of the inner cup melts, disengaging from the outer surface of the inner cup, thereby allowing the quenching material to fall into contact with the chemical heater.

7. The self-heating food assembly of claim 6, wherein the ring of material is a wax material and the quenching material is embedded within the wax material.

8. The self-heating food assembly of claim 6, further comprising:

an outer container comprising a sidewall, a bottom wall and an inner surface defining a cavity, wherein the inner cup is a metal container and is positioned within a cavity of the outer container, the inner metal container comprising a sidewall, a bottom wall, an inner surface and an outer surface.

9. A self-heating assembly for food, the assembly comprising:

an outer container comprising a sidewall, a bottom wall and an inter surface defining a cavity;

an inner container received within the cavity of the outer container, the inner container comprising a sidewall, a bottom wall, an inter surface and an outer surface, the inner surface of the inner container defining an interior cavity configured to hold food;

a reaction space defined between the inner surface of the outer container and the outer surface of the inner container;

a chemical heat source positioned within the reaction space and thermal communication with the inner container; and an activity element configured to be manipulated by a user to trigger heat generation by the chemical heat source to heat food held within the interior cavity of the inner container, wherein the chemical heat source comprises one or more heating chemicals in a frangible and hermetically sealed shell and a solid chemically reactive material in the reaction space, wherein the activation element comprises a cutting structure located within the reaction space, the cutting structure configured to pierce the hermetically sealed shell upon manipulation of the activation element by the user, thereby allowing the one or more heating chemicals to mix with the solid chemically reactive material, and wherein the activation element comprises a cutter, the assembly further comprising:
  a cap, wherein the cap is configured such that an application of physical force or moment force to the cap relative to the outer container causes the cap, the inner container, and the cutter to rotate around a longitudinal axis of the container.

10. The self-heating food assembly of claim 9, wherein the cutter comprises a sloped surface and a leading edge, and
  wherein the rotation of the cap, the inner container and the cutter relative to the outer container causes the sloped surface and the leading edge of the cutter to cut into the hermetically sealed exterior shell of the chemical heat source.

11. The self-heating food assembly of claim 10, wherein the chemical heat source further comprises a material disposed below the inner container and the cutter,
  wherein the material disposed below the inner container and the cutter is configured to exothermically react with the chemical located within the exterior shell of the chemical heat source when intermixed.

12. A self-heating assembly for food, the assembly comprising:
  an out container comprising a sidewall, a bottom wall an inner surface defining a cavity;
  an inner container received within the cavity of the outer container, the inner container comprising a sidewall, a bottom wall, an inter surface and an outer surface, the inner surface of the inner container defining an interior cavity configured to hold food;
  a reaction space defined between the inner surface of the outer container and the outer surface of the inner container;
  a chemical heat source positioned within the reaction space and in thermal communication the inner container; and
  an activation element configured to be manipulated by a user to trigger heat generation by the chemical heat source to heat food held within the interior cavity of the inner container,
  wherein the chemical heat source comprises one or more heating chemicals in a frangible and hermetically sealed shell and a solid chemically reactive material in the reaction space,
  wherein the activation element comprises a cutting structure located within the reaction space, the cutting structure configured to pierce the her sealed shell upon manipulation of the activation element by the user, thereby allowing the one or more heating chemicals to mix with the solid chemically reactive material,
  wherein the chemical heat source comprises:
  a plurality of the frangible and hermetically sealed shells containing the one or more chemicals, wherein each one of the hermetically sealed exterior shells is positioned in an annular space between a side surface of inner container and a side surface of the outer container.

13. The self-heating food assembly of claim 12, wherein an open area in the annular space is provided to spatially separate adjacent hermetically sealed exterior shells,
  the self-heating food assembly further comprising one or more vents in the outer container, wherein each vent is gas permeable but resistant to penetration by liquid, and wherein each one of the vents is positioned in one of the open areas.

14. A self-heating assembly for food, the assembly comprising:
  an outer container comprising a sidewall, a bottom wall and an inter surface defining a cavity;
  an inner container received within the cavity of the outer container, the inner container comprising a sidewall, a bottom wall, an inner surface and an outer surface, the inner surface of the inner container defining, an interior cavity configured to hold food;
  a reaction space defined between the inner surface of the outer container and the outer surface of the inner container;
  a chemical heat source positioned within the reaction space and in thermal communication with the inner container; and
  an activation element configured to be manipulated by a user to trigger heat generation by the chemical heat source to heat food held within the interior cavity of the inner container,
  wherein the chemical heat source comprises one or more heating chemicals in a frangible and hermetical sealed shell and a solid chemically reactive material in the reaction space,
  wherein the activation element comprises a cutting structure located within the reaction space, the cutting structure configured to pierce the hermetically sealed shell upon manipulation of the activation element by the user, thereby allowing the one or more heating chemicals to mix with the solid chemically reactive material;
  a plurality of first vent openings in the inner container;
  a plurality of second vent openings in the outer container,
  wherein each first vent opening moves into alignment with a corresponding one of the second vent openings when the activation element is manipulated by the user to initiate an exothermic chemical reaction in the self-heating assembly.

15. The self-heating assembly of claim 14, wherein each of the second vents is formed from an opening in. outer container, and a vent cover affixed over the opening in the outer container, thereby providing a gas permeable vent that is resistant to penetration by liquids.

16. A self-heating food assembly comprising:
  a cup assembly comprising:
    an inner cup; and
    one or more cutting structures fixedly coupled to the inner cup, such that rotation of inner cup about a longitudinal axis also causes rotation of the one or more cutting structures about the longitudinal axis,
  a packet assembly comprising;
    a liquid packet carrier; and
    one or more liquid packets disposed in an annular space between the liquid packet carrier and the inner cup, each liquid packet comprising an exterior shell surrounding a liquid,
    wherein the packet assembly is positioned relative to the cup assembly such that the one or more cutting structures are positioned relative to the one or more liquid packets such that rotation of cup assembly within the packet assembly causes each cutting structure to pierce, compress, rupture, or cut an adjacent one of the one or more liquid packets;
  a powder assembly disposed below and adjacent to the cup assembly and the packet assembly, wherein the powder assembly comprises:
    one or more surfaces that define an internal cavity containing a material configured to exothermically react with the liquid in the one or more liquid packets when intermixed, and
    wherein one or more of the surfaces of the powder container is formed of a liquid-permeable material, a liquid soluble material, or a liquid reactive material, such that the liquid will penetrate into or through the powder container and contact the material inside the powder container to initiate the exothermic reaction; and a cap fixedly connected to the inner cup such that rotation of the cap causes the inner cup to rotate as well.

* * * * *